(12) United States Patent
Seol

(10) Patent No.: US 8,434,107 B2
(45) Date of Patent: Apr. 30, 2013

(54) SYSTEM AND METHOD FOR DISPLAYING ELECTRONIC PROGRAM GUIDE

(75) Inventor: Seong-Woon Seol, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 12/601,936

(22) PCT Filed: May 19, 2008

(86) PCT No.: PCT/KR2008/002797
§ 371 (c)(1),
(2), (4) Date: Nov. 25, 2009

(87) PCT Pub. No.: WO2008/147069
PCT Pub. Date: Dec. 4, 2008

(65) Prior Publication Data
US 2010/0175085 A1 Jul. 8, 2010

(30) Foreign Application Priority Data
May 28, 2007 (KR) ........................ 10-2007-0051276

(51) Int. Cl.
*H04N 5/445* (2011.01)
(52) U.S. Cl.
USPC ............................................. 725/40; 725/58
(58) Field of Classification Search ........................ None
See application file for complete search history.

(56) References Cited

U.S. PATENT DOCUMENTS

| | | | |
|---|---|---|---|
| 8,230,456 B2* | 7/2012 | Jacoby et al. | 725/9 |
| 2002/0035727 A1 | 3/2002 | Numata et al. | |
| 2002/0147975 A1 | 10/2002 | Seo | |
| 2003/0177495 A1 | 9/2003 | Needham et al. | |
| 2003/0237097 A1* | 12/2003 | Marshall et al. | 725/105 |
| 2006/0010470 A1 | 1/2006 | Kurosaki et al. | |
| 2006/0020973 A1 | 1/2006 | Hannum et al. | |
| 2006/0143653 A1 | 6/2006 | Suh | |
| 2008/0168502 A1* | 7/2008 | Trauth | 725/46 |
| 2009/0019490 A1* | 1/2009 | Tanikawa | 725/44 |
| 2009/0150935 A1* | 6/2009 | Peters et al. | 725/46 |

OTHER PUBLICATIONS

International Search Report dated Oct. 16, 2008.
Extended European Search Report dated Jun. 5, 2012 for Application 08753593.6.

* cited by examiner

Primary Examiner — Chris Parry
(74) *Attorney, Agent, or Firm* — KED & Associates, LLP

(57) ABSTRACT

Provided is a method for providing electronic program guide of an image display device. A system for displaying an electronic program guide includes a management server and an image display device. The management server collects recommended program-related information from at least one image display device connected through a network, and compiles the same. The image display device receives the compiled recommended program-related information from the management server, and reflects the received recommended program-related information to the electronic program guide to reconstruct the electronic program guide.

9 Claims, 5 Drawing Sheets

SYSTEM AND METHOD FOR DISPLAYING ELECTRONIC PROGRAM GUIDE

TECHNICAL FIELD

Embodiments of the present disclosure relate to providing an electronic program guide (EPG) of an image display device.

BACKGROUND ART

In general, broadcasting signals may be transmitted together with an EPG, which is additional information for providing broadcasting program information to a user, in a digital broadcasting.

The EPG provides various information regarding programs broadcasted in the past, programs currently in broadcasting, and programs to be broadcasted in the future to a user.

Also, the provided EPG is displayed on a monitor of a receiver and used for convenient identification of program information and selection of a specific program by the user.

DISCLOSURE OF INVENTION

Technical Problem

An EPG provided by a related art image display device merely provides only broadcasting information of a broadcast program. The construction of the EPG should be improved to increase user convenience and provide more various information to a user.

Embodiments provide a system and a method for displaying an EPG that guides a user so that the user can select, set reservation viewing, and set reservation recording on an EPG screen more conveniently and efficiently.

Technical Solution

In one embodiment, a system for displaying an electronic program guide includes: a management server collecting recommended program-related information from at least one image display device connected through a network, and compiling the same; and an image display device receiving the compiled recommended program-related information from the management server, and reflecting the received recommended program-related information to the electronic program guide to reconstruct the electronic program guide.

In another embodiment, a method for controlling an electronic program guide display system includes: compiling recommended program-related information from at least one image display device connected through a network; receiving the compiled recommended program-related information; reflecting the received recommended program-related information to an electronic program guide to reconstruct the electronic program guide; and displaying the reconstructed electronic program guide according to a user's request.

In further another embodiment, an image display device includes: a network interface receiving recording-related information compiled from at least one image display device connected to a network; a storage storing electronic program guide information and the recording-related information received from an outside; a controller checking recording-related information of each program existing on the electronic program guide, and controlling the electronic program guide reflecting the checked recording-related information to be displayed; and an electronic program guide generator generating the electronic program guide including the recording-related information of each program in response to a control signal of the controller.

In still further another embodiment, a method for controlling an electronic program guide display system includes: compiling recording-related information from at least one image display device connected through a network; receiving the compiled recording-related information; reflecting relevant recording-related information of each program to an electronic program guide to reconstruct the electronic program guide; and displaying the electronic program guide reflecting the recording-related information.

The details of one or more embodiments are set forth in the accompanying drawings and the description below. Other features will be apparent from the description and drawings, and from the claims.

Advantageous Effects

According to an embodiment, various shared information transmitted in real time from an external set registered as a user's friend is reflected to an EPG, so that a great aid can be given in viewing and recording by the user. Also, regarding programs broadcasted on an overlapping time band, a reservation status and recording materials of other users registered as the user's friends are searched for, so that the programs can be effectively managed. Consequently, various information can be provided to give a great aid to a user selecting a broadcasting program.

MODE FOR THE INVENTION

Reference will now be made in detail to the embodiments of the present disclosure, examples of which are illustrated in the accompanying drawings. However, the present disclosure is not limited to embodiments set forth herein and other embodiments can be readily proposed by addition, modification, and deletion of other elements, which fall within the scope of the present disclosure.

Figure 1:
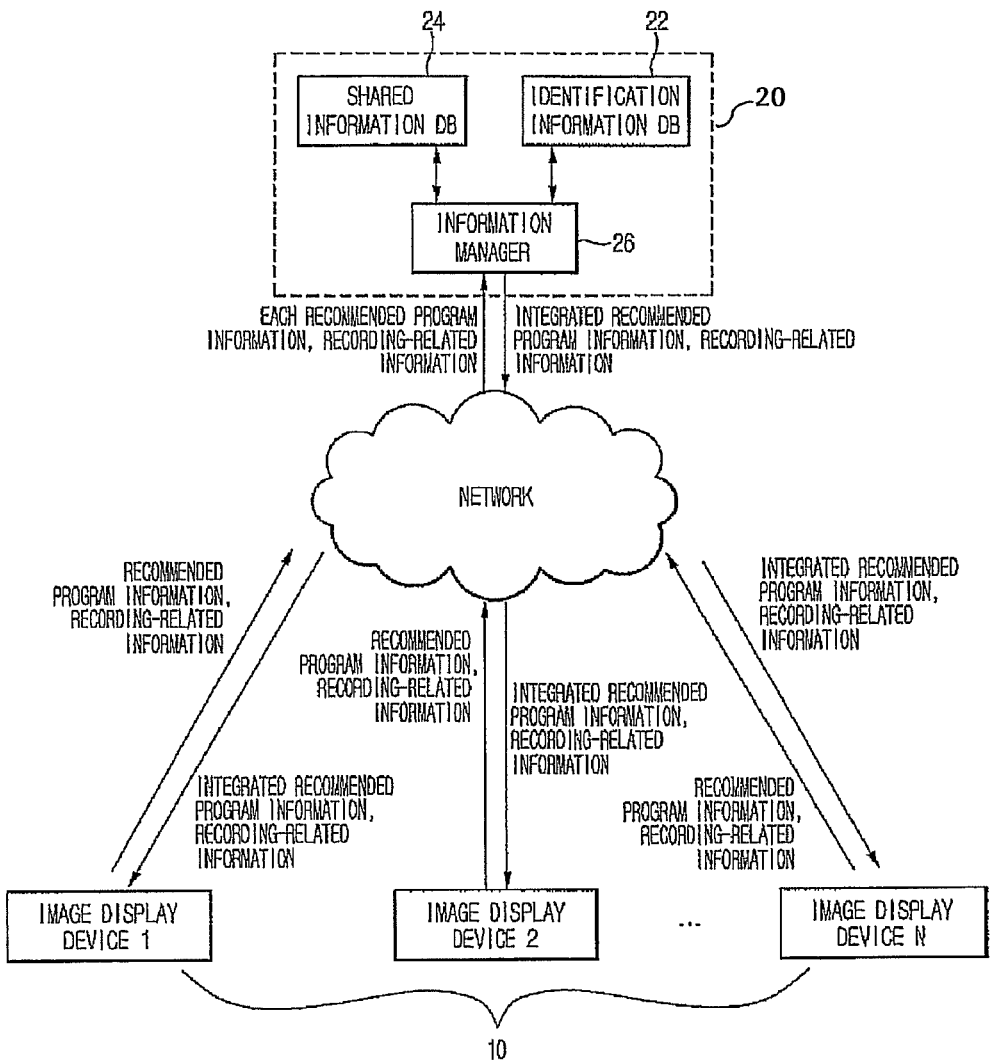
FIG. 1 is a schematic view of an electronic program guide display system according to an embodiment.
Figure 2:
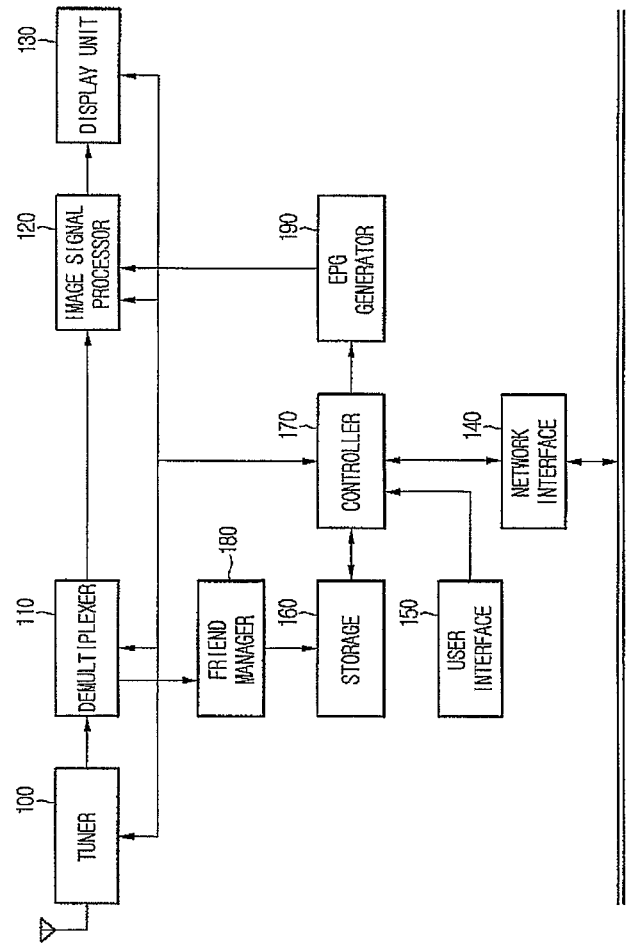
FIG. 2 is a block diagram of the construction of an image display device according to an embodiment.
Figure 3:
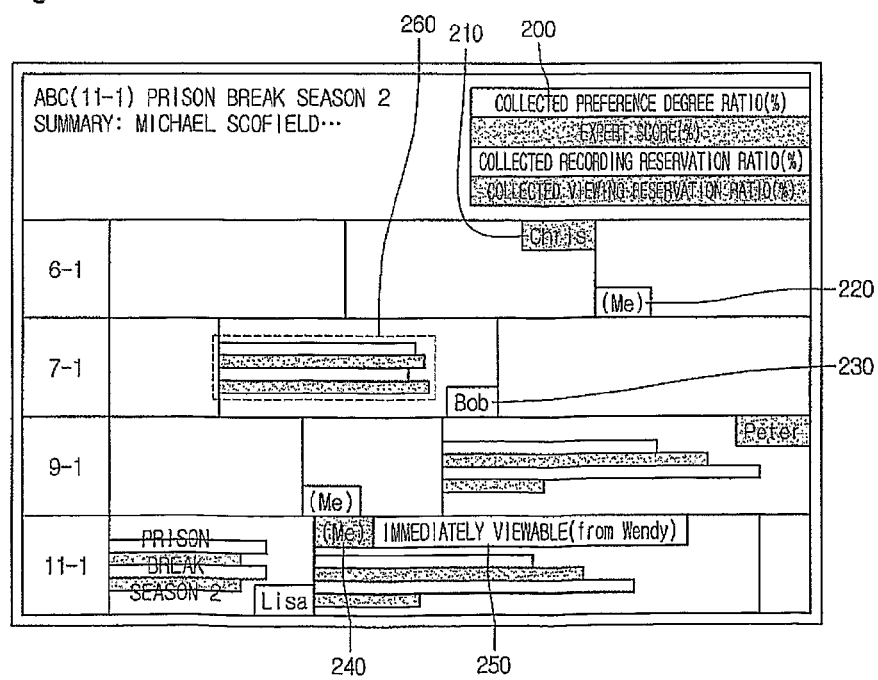
FIG. 3 is a view illustrating an EPG screen displayed on a screen of an image display device according to an embodiment.

FIG. 1 is a schematic view of an electronic program guide display system according to an embodiment, FIG. 2 is a block diagram of the construction of an image display device according to an embodiment, FIG. 3 is a view illustrating an EPG screen displayed on a screen of an image display device according to an embodiment, and FIGS. 4 to 7 are flowcharts explaining step by step a method for controlling an image display device according to an embodiment.

A system for displaying an electronic program guide is illustrated in FIG. 1.

That is, a first image display device 10 to an N-th image display device 10 receive broadcasting signals transmitted from a broadcasting station (not shown). Also, the image display devices display image/voice signals and an EPG on a screen according to selection by a user. A predetermined management server 20 is provided to a network.

The management server 20 collects and compiles predetermined shared information of the first image display device to the N-th image display device connected through the network, and delivers the compiled shared information to respective image display devices 10 so that the information is shared.

Here, the management server 20 includes an identification information database (DB) 22 storing identification information of the first image display device to the N-th image display device 10, a shared information DB 24 storing shared information received from the first image display device to the N-th image display device 10 and corresponding to the identification information, and an information manager 26 periodically compiling shared information from the first image display device to the N-th image display device 10, storing the information in the shared information database 24, and continuously managing the stored information.

Here, the shared information includes recommended program-related information and recording-related information.

The recommended program-related information is information regarding a preference degree compiled from the plurality of image display devices 10 connected through the network, an expert score, a reservation recording ratio, and a reservation viewing ratio.

Also, the recording-related information includes a reservation recording list and a recording list compiled from the plurality of image display devices 10 connected through the network. The information manager 26 periodically complies and manages the information and reflects the information to an electronic program guide in real time.

That is, according to the embodiment, shared information for each user is managed by the management server 20 connected to the plurality of image display devices 10 through the network, so that all users of the image display devices 10 connected to the management server 20 can share the information.

Also, the management server 20 collects and complies shared information so that the shared information is reflected to the electronic program guide in real time.

Also, referring to FIG. 2, the image display device includes a tuner 100 selecting broadcasting signals received from the outside, a demultiplexer 110 demultiplexing broadcasting signals received through the tuner 100 to separate the signals into a voice stream, an image stream, and an additional information stream, an image signal processor 120 receiving an image signal separated by the demultiplexer 110 and performing a signal processing on the signal so that the signal is displayable, a display unit 130 displaying the image signal signal-processed by the image signal processor 120, a network interface 140 connected to the network to transmit shared information and receive compiled shared information, a user interface 150 receiving a requirement command from a user, a storage 160 for storing an image stream, a voice stream, and an additional information stream separated by the demultiplexer 110, and shared information received through the network interface 140, a controller 170 checking shared information of each program contained in electronic program guide information stored in the storage 160, and controlling the shared information to be reflected on an electronic program guide and the electronic program guide to be displayed according to an EPG display command input through the user interface 150, a friend manager 180 managing registration of an external image display device as a friend and reflecting shared information received from the external image display device to the electronic program guide to reconstruct the electronic program guide, and an electronic program guide generator 190 generating the electronic program guide reconstructed by the friend manager 180.

The operation of the image display device having the above construction will be described below.

The tuner 100 receives transport stream (TS) information from the outside.

The demultiplexer 110 separates the TS information received through the tuner 100 into a voice stream, an image stream, and an additional information stream.

That is, the TS information service information besides the image/voice information. The service information includes an event information table (EIT) and a time date table (TDT)/time offset table (TOT).

In detail, the EIT includes a title, a summary, a start time, and broadcasting time information of each program. The TDT/TOT includes current time information of each program.

Here, the EIT is provided for each source_id. That is, the EIT is provided for each virtual channel actually viewed by a viewer, not for each physical channel. The EIT provides information such as the number of actual programs, start times, lengths, and titles of respective programs included in about three hours for each virtual channel. Therefore, when EITs for all broadcasting channels are collected and formed as a database, an EPG that can give broadcasting program guide to a viewer can be formed.

The image signal processor 120 performs signal processing on an image signal separated by the demultiplexer 110 so that the image signal is displayable by the display unit 130.

At this point, the image signal processor 120 includes a video decoder (not shown) decompressing and decoding a provided image signal, and a scaler (not shown) converting an image signal such that the image signal is suited for a vertical frequency, resolution, and a screen ratio matching with the output standard of the display unit 130.

Also, the display unit 130 can be applied to various display modules such as digital light processing, a liquid crystal display device, and a plasma display panel.

The user interface 150 is a unit for receiving a requirement command by a user. Examples of the user interface 150 include a remote controller, a local key, a mouse, and a touch pen.

The network interface 140 transmits shared information to the outside through the network, and receives shared information compiled by a management server 20.

The compile shared information is stored in the storage 160, and reflected and displayed to an electronic program guide according to a command by the user.

That is, when an EPG display command is input, the controller 170 checks shared information of a program contained in the electronic program guide, and controls an electronic program guide to which the shared information of at least one program has been reflected to be displayed.

The friend manager 180 reflects shared information of at least one program contained in the electronic program guide to reconstruct the electronic program guide in response to a control signal of the controller 170, and manages friend registration of the image display device connected through the network.

Also, the electronic program guide generator 190 generates an electronic program guide to which shared information has been reflected by the friend manager 180.

Here, the shared information includes information regarding recommended programs collected by an external image display device registered as a friend, and recording-related information.

The recommended program information is statistical information obtained by computing a preference degree ratio collected from the external image display device, an expert score, a collected reservation recording ratio, and a collected reservation viewing ratio. The recording-related information is a recording list and reservation recording list information collected by the external image display device.

Referring to FIG. 3, an EPG 200 to which shared information has been reflected displays information 210 informing that viewing reservation of a program has been set by an external display device registered as a friend, information 220 informing that reservation recording of a program has been set by the user himself, information 230 informing that reservation recording of a program has been set by an external image display device registered as a friend, information 240 informing that viewing reservation of a program has been set by the user himself, information 250 informing that a program can be immediately viewed in the case where the program for which viewing reservation has been set by the user is already stored in an external image display device, and information 260 regarding recommended programs.

At this point, the displayed information can be in the form of identification information and friend information of a friend set.

Therefore, the user can easily select a program to be viewed on the basis of the information regarding the recommended programs displayed on the EPG.

Also, reservation recording and viewing reservation already set by the user can be changed on the basis of the information 230 informing that the reservation recording of the program has been set by the external image display device. The program can be immediately viewed without having to wait for a time at which the program is to be broadcasted on the basis of the information 250 informing that the program can be immediately viewed.

Though the shared information has been reflected and displayed on an EPG regardless of a user request, related shared information can be searched for and displayed only when the user has made viewing reservation or set reservation recording, which will be described later in detail.

Also, though the shared information has been reflected and displayed on only the EPG, the shared information corresponding to a channel to be switched can be provided as channel information of the channel in the case where the user inputs a channel switching command.

A method for controlling the image display device having the above-described construction according to an embodiment will be described in detail with reference to FIGS. 4 to 7.

Figure 4:
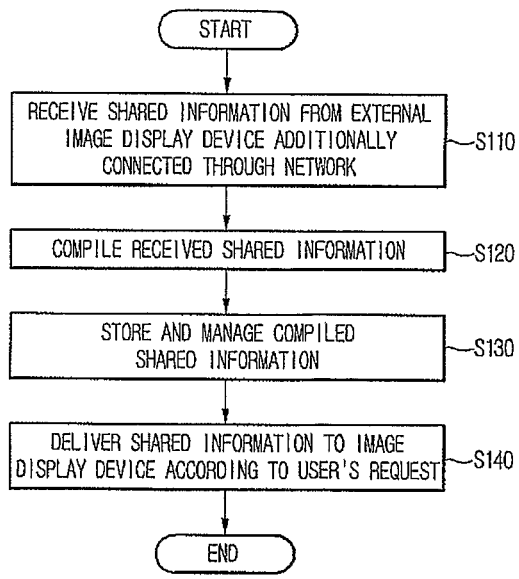
FIGS. 4 to 7 are flowcharts explaining step by step a method for controlling an image display device according to an embodiment.

A method managing shared information received from a plurality of image display devices periodically receives shared information from an external image display device connected through the network as illustrated in FIG. 4 (S110). The shared information includes recommended program-related information and recording-related information.

Subsequently, the received shared information is compiled (S120).

Also, the compiled shared information is stored and managed (S130).

Subsequently, the shared information is delivered to the image display device according to a user request (S140).

Also, the shared information is often collected and compiled from at least one external image display device so that the shared information is reflected to an electronic program guide.

Figure 5:
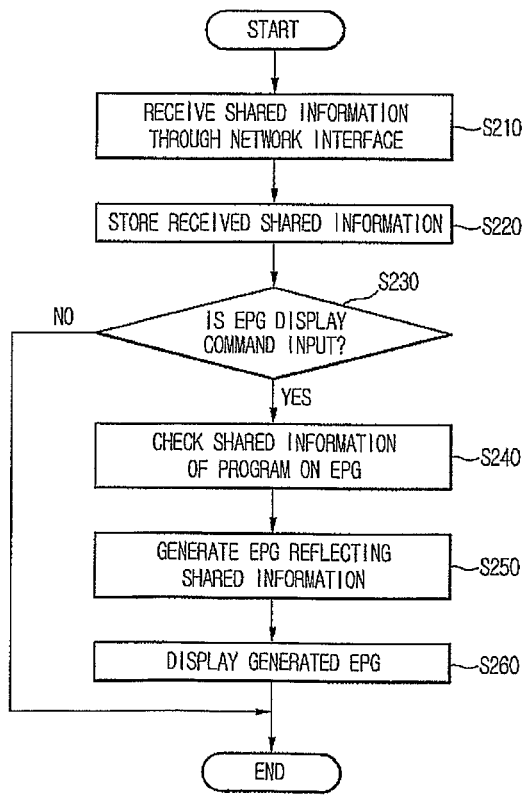

A method reflecting the compiled shared information to an electronic program guide receives shared information from the management server 20 through the network interface as illustrated in FIG. 5 (S210).

Also, the received shared information is stored (S220).

Subsequently, whether an EPG display command has been input by the user is judged (S230).

When the EPG display command is input as a result of the judgment (S230), corresponding shared information of a program on the EPG is checked (S240).

Subsequently, an EPG to which the shared information of the program is generated according to the checking result (S250).

Also, the generated EPG is displayed (S260).

Therefore, the user can easily perform reservation recording/viewing on the basis of the EPG to which the shared information has been reflected.

That is, in the case where a program for which viewing reservation has been set by the user himself exists on a recording list of an external image display device, the viewing-reservation program can be immediately viewed on the basis of recording programs on the recording list of the external image display device.

Also, reservation recording of the user can be easily set on the basis of a program stored in a reservation recording list of a friend, and selection of a program to be viewed by the user can be easily made on the basis of the recommended program information.

Though shared information delivered from an external image display device registered as a friend of a user has been reflected and displayed on an EPG, description corresponding to an embodiment where the user has set reservation recording and viewing reservation is made below.

Figure 6:
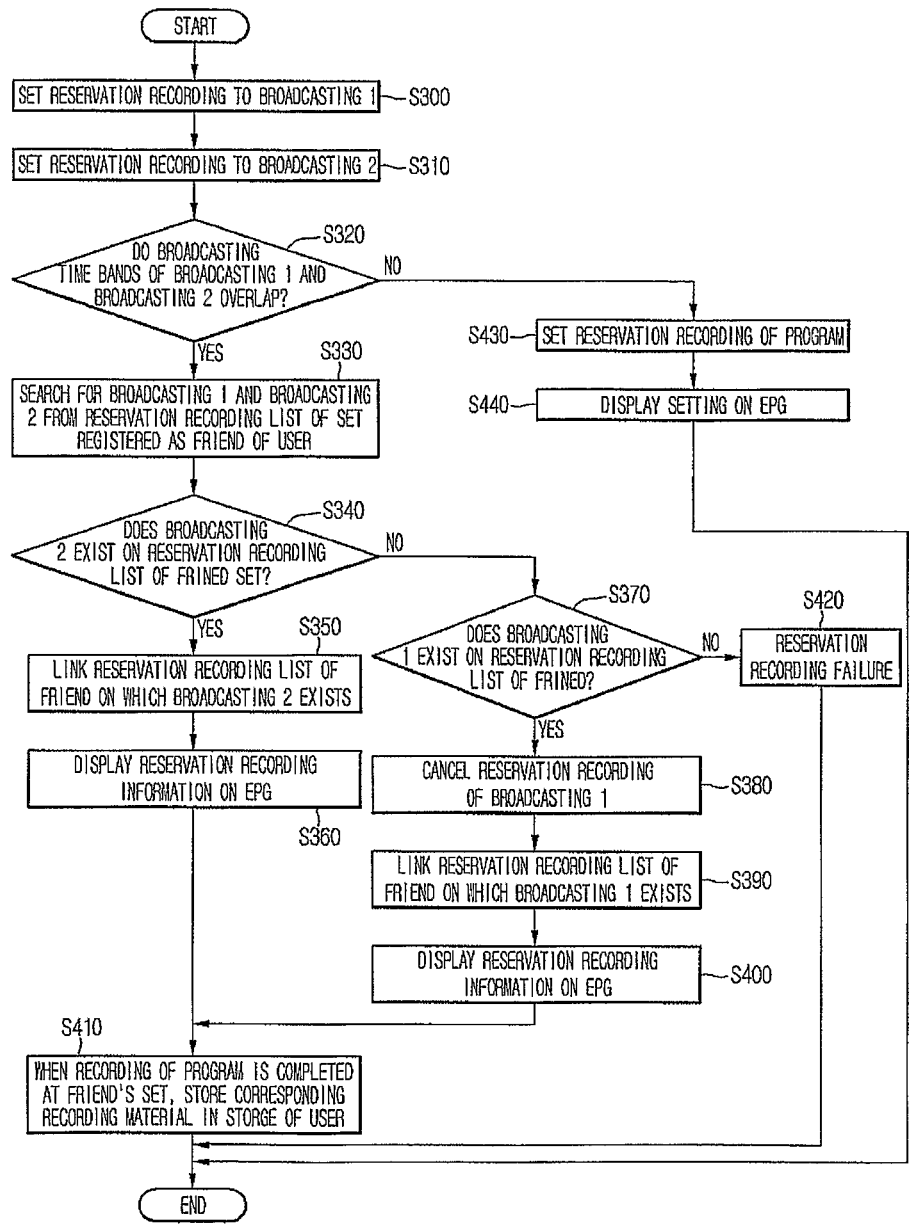

A method displaying an EPG in the case where the user sets reservation recording sets reservation recording of broadcasting 1 as illustrated in FIG. 6 (S300).

Subsequently, reservation recording of broadcasting 2 is set (S310).

Also, whether the broadcasting time bands of the broadcasting 1 and the broadcasting 2 to which reservation recording has been set overlap each other is judged (S320). That is, whether there exists a reservation recording program whose broadcasting time band overlaps that of the current reservation recording-set program is judged.

Subsequently, when the broadcasting times of the reservation recording-set programs overlap each other as a result of the judgment (S310), the broadcasting 1 and the broadcasting 2 are searched for from a reservation recording list of a set registered as a friend of the user (S330).

Also, whether the broadcasting 2 to which the user intends to set reservation recording exists in the reservation recording list of the friend set is judged (S340).

Subsequently, when the broadcasting 2 exists on the reservation recording list of the friend set as a result of the judgment (S340), the reservation recording list of the friend on which the broadcasting 2 exists is linked (S350). By doing so, the reservation recording of the program has been set can be known even on a reservation recording list of the user, and when the recording of the program is completed afterward, the recorded material can be viewed.

Also, reservation recording information informing that reservation recording of the program has been set on the EPG in the friend set is displayed (S360).

Also, when the broadcasting 2 does not exist on the reservation recording list of the friend set as a result of the judgment (S340), whether the broadcasting 1 exists on the reservation recording list of the friend set is judged (S370).

Subsequently, when the broadcasting 1 exists on the reservation recording list of the friend set as a result of the judgment (S370), reservation recording of the broadcasting 1 to which the reservation recording has been set is cancelled (S380).

Also, the reservation recording list of the friend set on which the broadcasting 1 exists is linked (S390).

Subsequently, reservation recording information informing that reservation recording of the program has been set on the EPG in the friend set is displayed (S400).

Also, when recording of the program is completed in the friend set, the recording-completed recording material is stored in a set of the user (S410). The recording material can be directly stored from the friend set or the recording list of the friend set is linked and the recording material can be reproduced.

Also, the broadcasting 1 does not exist on the reservation recording list of the friend set as a result of the judgment (S370), a reservation recording failure message due to overlapping of broadcasting times of programs to which reservation recording is to be set is displayed (S420).

Meanwhile, when the broadcasting time bands of the programs do not overlap each other as a result of the judgment (S320), reservation recording of the programs (broadcasting 1 and broadcasting 2) is set (S430).

Also, reservation recording information informing that the reservation recording has been set is displayed on the EPG (S440).

As described above, to make a reservation recording of two broadcasting programs whose broadcasting times overlap each other in setting reservation recording of a program, the user searches for the two broadcasting programs from the reservation recording list of the friend set.

When one of the broadcasting programs exists on the reservation recording list of the friend set, the user changes reservation recording setting of the user.

Also, when recording of the program is completed in the friend set, the program can be viewed from the recording list of the friend set afterward even when the user does not set reservation recording in person.

Figure 7:
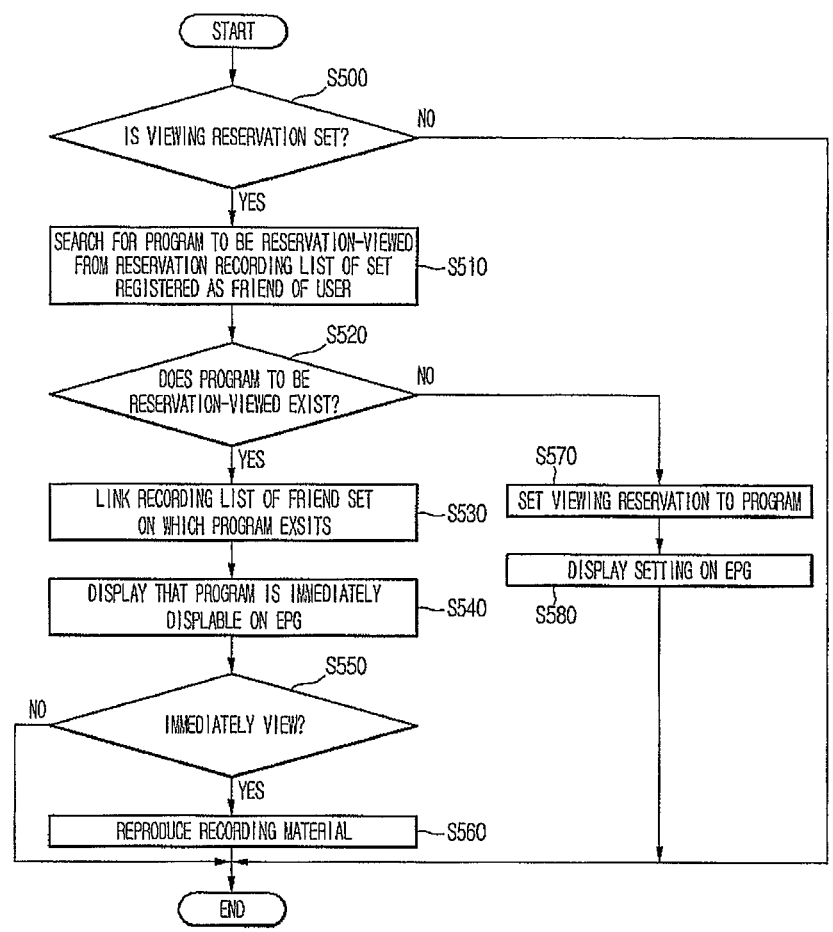

Also, a method displaying an EPG in the case where the user sets viewing reservation judges whether a viewing reservation set command is input from the user as illustrated in FIG. 7 (S500).

When the viewing reservation set command is input as a result of the judgment (S500), a program of which the user intends to make a viewing reservation is searched for from recording lists of the set of the user and the set registered as a friend (S510).

Subsequently, whether the program of which the user intends to make a viewing reservation exists on the recording list of the friend set is judged (S520).

When the program exists on the recording list of the friend set as a result of the judgment (S520), the recording list of the friend set on which the program exists is linked (S530).

Subsequently, information informing that the program can be immediately viewed without waiting for an actual broadcasting time is displayed on the EPG (S540).

When an immediate viewing command of a program is input from the user, a corresponding recording material is reproduced on the basis of the linked recording list of the friend set (S550-S560).

When the program does not exist as a result of the judgment (S520), viewing reservation of the program is set (S570).

Viewing reservation information informing viewing reservation setting of the program is displayed on the EPG (S580).

As described above, in the case where the user sets viewing reservation, whether a program of which the user intends to make a viewing reservation is already stored in the friend set. When the program is already stored in the friend set, information informing that the program can be immediately viewed without viewing reservation of the program is given, so that the user can immediately view the program without waiting for a broadcasting time of the program.

INDUSTRIAL APPLICABILITY

According to the proposed embodiment, more various broadcasting program information can be provided to the user, and thus a great aid can be provided in viewing and setting a reservation of a specific broadcast program. Therefore, there is an industrial applicability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An image display device comprising:
    a network interface for receiving recording-related information compiled from at least one image display device connected to a network;
    a storage for storing electronic program guide information and the recording-related information received from an outside;
    a controller for checking recording-related information of each program to be broadcast in future existing on the electronic program guide, and for controlling the electronic program guide reflecting the checked recording-related information to be displayed; and
    an electronic program guide generator for generating the electronic program guide including the recording-related information of each program in response to a control signal of the controller,
    wherein the recording-related information includes first status information and second status information, the first status information indicates a setting of a reservation recording of one program, and the first status information includes identification information of an image display device corresponding to the set reservation recording, wherein the first status information is displayed when reservation recording of the one program to be broadcasted in future is set by an external device,
    wherein the second status information indicates a stored recording of a program, and the second status information includes identification information of an image display device corresponding to the stored recording of the program, and wherein the second status information is displayed when the one program to be broadcasted in future is stored in the external device.

2. The image display device according to claim 1, wherein the recording-related information comprises at least one of a reservation recording list and a recording list collected from at least one set registered as a friend of a user from external image display devices connected through the network.

3. The image display device according to claim 2, wherein the controller comprises a friend manager reflecting the recording-related information delivered from the external image display device registered as a friend to the electronic program guide to reconstruct the electronic program guide.

4. The image display device according to claim 2, wherein when a program to which a user has set reservation viewing or reservation recording exists on the recording list of the external image display device, the controller controls status information informing that the program is immediately viewable to be separately displayed on the electronic program guide.

5. A method for controlling an electronic program guide display system, the method comprising:
compiling recording-related information from at least one image display device connected through a network;
receiving the compiled recording-related information;
reflecting relevant recording-related information of each program to be broadcast in future to an electronic program guide to reconstruct the electronic program guide; and
displaying the electronic program guide reflecting the recording-related information,
wherein the recording-related information includes first status information and second status information, the first status information indicates a setting of a reservation recording of one program, and the first status information includes identification information of an image display device corresponding to the set reservation recording, wherein the first status information is displayed when reservation recording of the one program to be broadcasted in future is set by an external device,
wherein the second status information indicates a stored recording of a program, and the second status information includes identification information of an image display device corresponding to the stored recording of the program, and wherein the second status info nation is displayed when the one program to be broadcasted in future is stored in the external device.

6. The method according to claim 5, wherein the recording-related information comprises a reservation recording list and a recording list compiled from at least one set registered as a friend of a user from external image display devices connected to the network.

7. The method according to claim 5, further comprising, when recording-related information meaning that a program to which a user has set viewing reservation exists on the recording list of the external image display device is displayed on the electronic program guide, separately displaying status information informing that the program is immediately viewable on the electronic program guide.

8. A method for displaying an electronic program guide, the method comprising:
receiving recording-related information from at least one image display device connected through a network; and
displaying the electronic program guide having recording-related information of each program to be broadcast in future,
wherein the recording-related information includes first status information that indicates a setting of a reservation recording of one program, and the first status information includes identification information of an image display device corresponding to the set reservation recording, wherein the first status information is displayed when reservation recording of the one program to be broadcasted in future is set by an external device,
wherein the recording-related information further includes second status information that indicates a stored recording of a program, and the second status information includes identification information of an image display device corresponding to the stored recording of the program, and
wherein the second status information is displayed when the one program to be broadcast in future is stored in the external device.

9. The method according to claim 8, wherein the recording-related information further includes a reservation recording list and a recording list compiled from at least one set registered as a friend of a user from image display devices connected to the network.

* * * * *